United States Patent
Ludlow (10) Patent No.: US 10,571,147 B1
(45) Date of Patent: Feb. 25, 2020

(54) DIGITAL COMMUNICATION TIMING DISCOVERY OVER A TWO WIRE CONNECTION

(71) Applicant: Crestron Electronics, Inc., Rockleigh, NJ (US)

(72) Inventor: Jeffrey Ludlow, Woodcliff Lake, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 11 days.

(21) Appl. No.: 16/154,390

(22) Filed: Oct. 8, 2018

(51) Int. Cl.
- *F24F 11/56* (2018.01)
- *F24F 11/88* (2018.01)
- *F24F 11/61* (2018.01)
- *F24F 11/523* (2018.01)

(52) U.S. Cl.
CPC ............ *F24F 11/56* (2018.01); *F24F 11/523* (2018.01); *F24F 11/61* (2018.01); *F24F 11/88* (2018.01)

(58) Field of Classification Search
None
See application file for complete search history.

(56) References Cited

U.S. PATENT DOCUMENTS

| | | | | |
|---|---|---|---|---|
| 6,631,108 B1* | 10/2003 | Hogan | ............... | G11B 7/00456 369/11 |
| 7,924,174 B1* | 4/2011 | Gananathan | ......... | H05B 37/029 315/149 |
| 2007/0273509 A1* | 11/2007 | Gananathan | ....... | H05B 37/0218 340/540 |
| 2007/0273539 A1* | 11/2007 | Gananathan | ........... | G08B 7/066 340/615 |
| 2017/0277147 A1* | 9/2017 | De Vaan | ................ | G05B 15/02 |
| 2019/0018597 A1* | 1/2019 | Zhang | .................... | G11C 16/32 |
| 2019/0093916 A1* | 3/2019 | Lee | ........................ | F24F 1/0003 |
| 2019/0318798 A1* | 10/2019 | Frolikov | ............... | G06F 3/0634 |

* cited by examiner

Primary Examiner — Eunsook Choi
(74) Attorney, Agent, or Firm — Crestron Electronics, Inc.

(57) ABSTRACT

An HVAC system and method for digital communication timing discovery over a two wire connection. The HVAC system comprises a thermostat and at least one remote sensor unit comprising at least one sensor with an associated memory. The thermostat comprises a communication interface adapted to be connected to the remote sensor unit via a two-wire connection over a communication channel. The thermostat further comprises a controller adapted to perform a communication timing discovery to determine a communicating timing value that minimizes communication error rates for each sensor of the remote sensor unit by performing an iterative communication error rate detection operation over a range of timing values. The thermostat controller uses the determined communication timing value for communicating with the respective sensor during normal operation to receive sensor information.

22 Claims, 5 Drawing Sheets

DIGITAL COMMUNICATION TIMING DISCOVERY OVER A TWO WIRE CONNECTION

BACKGROUND OF THE INVENTION

Technical Field

Aspects of the embodiments relate to digital communication techniques, and more particularly to a digital communication timing discovery over a two wire connection.

Background Art

Thermostats are used as control panels for control of heating, ventilation, and air conditioning (HVAC) systems. Most thermostats contain internal temperature sensors and thereby the placement of the thermostat dictates the temperature control of an entire house. They are typically installed in hallways, which may produce undesired temperatures in living spaces, such as bedroom and living rooms. More advanced systems use remote sensors to receive temperature information from locations where temperature monitoring is actually desired. Thus, the thermostat may be placed in any hidden or easily accessible location.

To enable remote sensor installations, communication wires are typically ran from the remote sensors to the thermostat. However, in retrofit commercial or residential installations, there is a desire to utilize existing wiring. While existing wires may be used for analog sensor types, such as thermistor temperature sensors, analog reliability comes at the cost of limiting the signal to a single data source (e.g., temperature-only). For advanced systems, it is desired to measure other conditions, such as humidity.

There are thermostats and remote sensor products designed with digital interfaces to allow multisource data over a single line, allowing the remote sensor to send both temperature and humidity measurements over a two-wire cable. Unlike common analog HVAC sensor products, such digital remote sensors use a high speed, serial digital communication system, sent over the two-wire non-polarized interface. One wire is used for data, and the second wire is used for ground.

Timing of the digital communication signal in such two-wire communications is critical for reliable operation. Timing can be affected by unavoidable, or hard to predict, installation characteristics, such as cable length, cable type, and proximity to other equipment. The loading from these factors affects rise and fall times of the line, which in turn affects the timing of the digital signal recovered in the sensor. When timing falls outside acceptable ranges, the sensors will not communicate. This can result in thermostat controller operation being suspended.

Prior timing adjustments as well as debugging operations to assess communication reliability were typically designed around typical failure characteristics, as it is difficult to account for all valid field installation characteristics. However, some timing specifications have a rather large span, and reliable operation would not be achieved simply designing around typical characteristics. One implementation was to measure the digital signal's rise time to understand loading on the line and how slow the signal is. Then the timing may be adjusted based on how much slower it looked compared to a nominal value. Slower rise time is generally associated with longer cable lengths. However, the rise time is not the only timing factor affecting communication reliability. While they may address the characteristics of the installation, they fail to address the communication characteristics of the remote hardware and associated digital logic. The main problem with making timing adjustments via rise time measurements or other timing observations is that they are not actually assessing whether the adjustment improves communication. They simply move an operating point by assuming an association to the observation.

Accordingly, a need has arisen for a system and method for digital communication timing discovery over a two wire connection.

SUMMARY OF THE INVENTION

It is an object of the embodiments to substantially solve at least the problems and/or disadvantages discussed above, and to provide at least one or more of the advantages described below.

It is therefore a general aspect of the embodiments to provide systems, methods, and modes for digital communication timing discovery over a two wire connection that will obviate or minimize problems of the type previously described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

DISCLOSURE OF INVENTION

According to one aspect of the embodiments, an HVAC system is provided comprising a thermostat and a remote sensor unit comprising at least one sensor with an associated memory. The thermostat comprises a communication interface adapted to be connected to the remote sensor unit via a two-wire connection over a communication channel, and a controller adapted to perform a communication timing discovery. Wherein for each sensor of the remote sensor unit the controller is adapted to perform a communication error rate detection operation over a range of timing values between a minimum timing value and a maximum timing value, wherein for each timing value in the range of timing values the controller is adapted to: write a data parameter on a memory of a respective sensor using a respective timing value, attempt to read the data parameter from the memory of the respective sensor using the respective timing value, and determine an error rate for the respective timing value indicating the rate of success of the read attempt. Wherein the controller selects a communication timing value from the range of timing values that minimized error rates during the communication error rate detection operation, and uses the selected communication timing value for communicating with the respective sensor during normal operation to receive sensor information.

According to an embodiment, the controller records an error or a high error rate when the read attempt of the data parameter is unsuccessful, and no error or a low error rate when the read attempt of the data parameter is successful. According to a further embodiment, the controller repeats the communication error rate detection operation a plurality of times per each timing value of the range of timing values and averages the determined error rates for the respective timing value. According to an embodiment, the controller selects the communication timing value that minimized error rates by: finding a lowest error rate from the determined error rates of respective timing values of the range of timing values, determining a subset range of timing values comprising error rates equal to the lowest error rate, and selecting a communication timing value from the subset range of timing values. The controller may select a communication timing value located at a midpoint of the subset range of timing values as the communication timing value that minimized error rates.

According to an embodiment, the communication interface of the thermostat comprises a plurality of communication channels. The controller may perform the communication timing discovery for each of the plurality of communication channels.

According to a further embodiment, the HVAC system comprises a plurality of sensors each with an associated memory, wherein the plurality of sensors are either located within a single remote sensor unit connected to the thermostat over a single communication channel, distributed among a plurality of remote sensor units connected to the thermostat over a single communication channel, distributed among a plurality of remote sensor units each connected to the thermostat over a separate communication channel, or any combinations thereof. According to one embodiment, the thermostat controller may perform the communication error rate detection operation for each of the plurality of sensors by addressing the plurality of sensors by sensor type. According to another embodiment, each memory associated with each of the plurality of sensors comprises an identification code adapted to identify the respective sensor. The controller may perform the communication error rate detection operation for each of the plurality of sensors by addressing each sensor by its identification code.

According to an embodiment, a communication timing value may be selected for each sensor type of the plurality of sensors over each communication channel. According to another embodiment, a communication timing value may be selected for each individual sensor over each communication channel. According to yet another embodiment, a communication timing value may be selected for all sensors of the plurality of sensors connected on each communication channel. Each communication timing value for all the sensors of the plurality of sensors on each communication channel may be selected by: calculating an exponential error vector from the determined error rates of the range of timing of all the sensors on the respective communication channel, finding a lowest error rate from the calculated exponential error vector, determining a subset range of timing values comprising error rates equal to the lowest error rate, and selecting a communication timing value from the subset range of timing values. The controller may calculate the exponential error vector by: squaring each stored error rate determined for the respective communication channel, summing sets of the squared error rates corresponding to each timing value of the range of timing values, and constructing the exponential error vector using the summed sets of squared error rates. According to an embodiment, the controller selects a communication timing value located at a midpoint of the subset range of timing values as the communication timing value that minimized error rates.

According to an embodiment, the two-wire connection comprises a data wire and a ground wire. According to an embodiment, each sensor comprises at least one of a temperature sensor, a humidity sensor, a pressure sensor, an airflow sensor, an HVAC status sensor, an occupancy sensor, a carbon dioxide sensor, a light sensor, and a color temperature sensor.

According to another aspect of the embodiments, an HVAC system is provided comprising a thermostat and a plurality of remote sensor units each comprising at least one sensor each comprising an associated memory. The thermostat comprises a communication interface adapted to be connected to each of the plurality of remote sensor units via a two-wire connection over at least one communication channel, and a controller adapted to perform a communication timing discovery. Wherein for each sensor of the plurality of remote sensor units over each communication channel the controller is adapted to perform a communication error rate detection operation over a range of timing values between a minimum timing value and a maximum timing value. Wherein for each timing value in the range of timing values the controller is adapted to write a data parameter on a memory of a respective sensor using a respective timing value, attempt to read the data parameter from the memory of the respective sensor using the respective timing value, and determine an error rate for the respective timing value indicating the rate of success of the read attempt. Wherein the controller is further adapted to select a communication timing value from the range of timing values that minimized error rates during the communication error rate detection operation, and use the selected communication timing value for communicating with the respective sensor during normal operation to receive sensor information.

According to another aspect of the embodiments, a method is provided of performing a communication timing discovery by a thermostat connected via a two-wire connection to a remote sensor unit comprising at least one sensor with an associated memory. The method comprises the step of performing a communication error rate detection operation over a range of timing values between a minimum timing value and a maximum timing value. Wherein for each timing value in the range of timing values the communication error rate detection operation comprises the steps of: writing a data parameter on the memory of the at least one sensor using a respective timing value, attempting to read the data parameter from the memory of the at least one sensor using the respective timing value, and determining an error rate for the respective timing value indicating the rate of success of the read attempt. Wherein the method further comprises the steps of selecting a communication timing value from the range of timing values that minimized error rates during the communication error rate detection operation, and using the selected communication timing value for communicating with the at least one sensor during normal operation to receive sensor information.

According to another aspect of the embodiments, a system is provided for detecting communication timing requirements over a two-wire connection. The system comprises a master controller device and a plurality of remote slave devices each comprising an associated memory. The master controller device comprises a communication interface adapted to be connected to each of the plurality of remote slave devices via a two-wire connection over at least one communication channel, and a controller adapted to perform a communication timing discovery. Wherein for each of the plurality of remote slave devices over each communication channel the controller is adapted to perform a communication error rate detection operation over a range of timing values between a minimum timing value and a maximum timing value. Wherein for each timing value in the range of timing values the controller is adapted to write a data parameter on a memory of a respective remote slave device using a respective timing value, attempt to read the data parameter from the memory of the respective remote slave device using the respective timing value, and determine an error rate for the respective timing value indicating the rate of success of the read attempt. Wherein the controller is further adapted to select a communication timing value from the range of timing values that minimized error rates during the communication error rate detection operation, and use the selected communication timing value for communicating with the respective remove slave device during normal operation.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWINGS

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" or "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.
100 HVAC Control System
101 Thermostat
102 HVAC System
105 Display
106 User Interface
110 Two-Wire Connection
111 Remote Sensor
112 Remote Sensor
113 Remote Sensor
201 Controller
202 Memory
204 Power Interface
206 HVAC Interface
210 Communication Interface
211 Communication Interface
212 Temperature Sensor
214 Memory
216 Humidity Sensor
218 Memory
221 Temperature Sensor Part
222 Humidity Sensor Part
300 Square Wave of a Sent Signal
301 Sent High Pulse (or "1")
302 Sent Low Pulse (or "0")
310 Waveform of a Read Signal
311 Received High Pulse (or "1")
312 Received Low Pulse (or "0")
400 Flowchart Illustrating the Steps for a Method of Digital Communication Timing Discovery over a Two Wire Connection
402-424 Steps of Flowchart 400
501 Plot of Error Rates for the Temperature Sensor
502 Plot of Error Rates for the Humidity Sensor
503 Plot of Resulting Error Vector

List of Acronyms Used in the Specification in Alphabetical Order

The following is a list of the acronyms used in the specification in alphabetical order.
ADC Analog to Digital Converter
ASIC Application Specific Integrated Circuit
AWG American Wire Gauge C Channel Counter
$C_{max}$ Maximum Channel Count
CAT5 Category 5
EEPROM Electrically Erasable Programmable Read-Only Memory
F Fahrenheit
HVAC Heating, Ventilation, and Air Conditioning
IC Integrated Circuit
I/O Input/Output
LCD Liquid Crystal Display
MCU Microcontroller
n Predetermined Timing Increment
RAM Random-Access Memory
RH Relative Humidity
RISC Reduced Instruction Set Computer
ROM Read-Only Memory
S Sensor Counter
$S_{max}$ Maximum Sensor Type Count
T Timing Parameter
$T_{max}$ Maximum Timing Value
$T_{min}$ Minimum Timing Value
USB Universal Serial Bus
V Volts
VAC Voltage, Alternating Current

MODE(S) FOR CARRYING OUT THE INVENTION

For 40 years Crestron Electronics, Inc. has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein can be manufactured by Crestron Electronics, Inc., located in Rockleigh, N.J.

The different aspects of the embodiments described herein pertain to the context of a system and method of digital communication timing discovery over a two wire connection, but is not limited thereto, except as may be set forth expressly in the appended claims. While the present embodiments are described as being implemented for communication between a thermostat and remote sensors, the present timing discovery techniques may be implemented on any master controller and a slave device connected over a two wire, poor-quality, poorly-matched, or marginal wired links, where having more data over less wires is desirable, such as in many retrofit cases.

Figure 1:
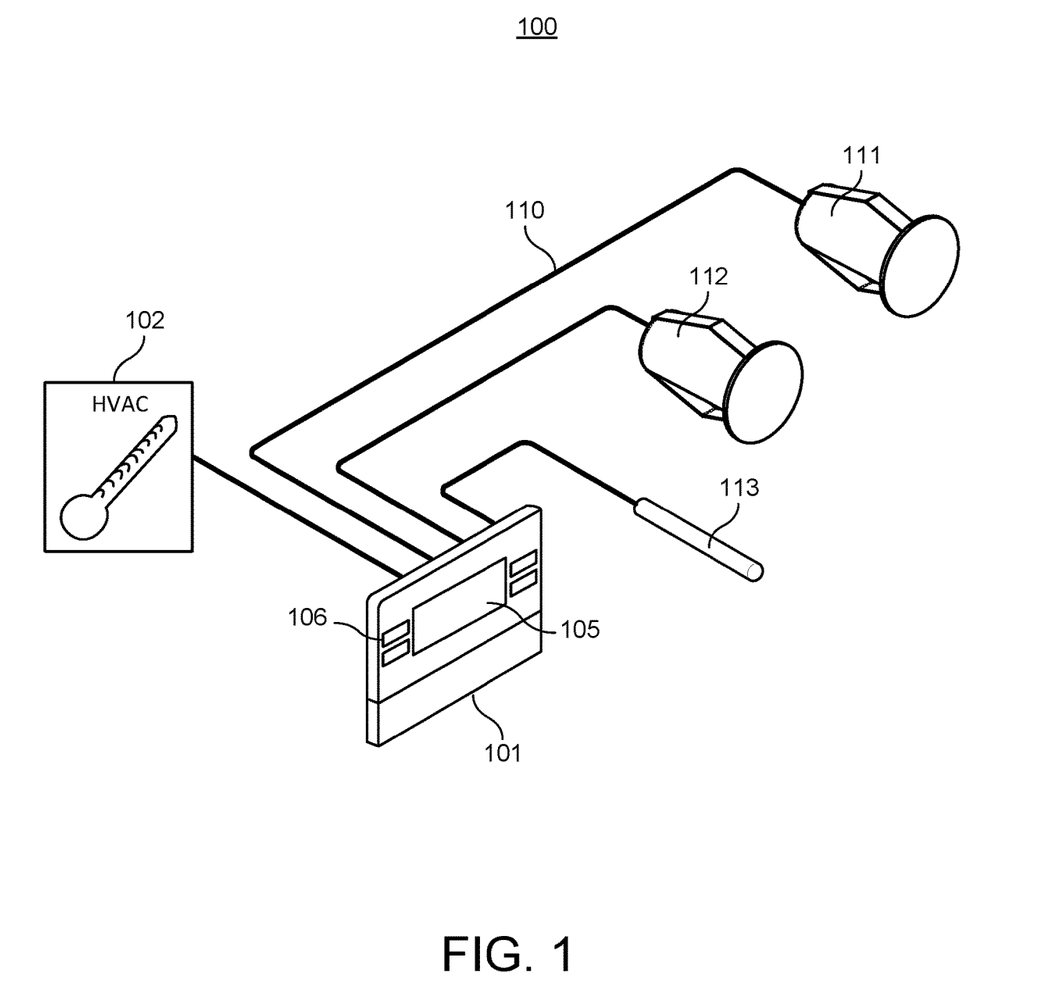
FIG. 1 illustrates an HVAC control system according to the present embodiments.

Referring to FIG. 1, there is shown a heating, ventilation, and air conditioning (HVAC) control system 100 according to an illustrative embodiment. The HVAC control system 100 may comprise a thermostat 101. The thermostat 101 may be a CHV-THSTAT thermostat or a CHV-TSTAT thermostat available from Crestron Electronics, Inc. of Rockleigh, N.J. The thermostat 101 may be configured for heating and cooling control of forced air, radiant, heat pump, dual fuel heat pump, or similar HVAC systems 102. The thermostat 101 may comprise a display 105, such as a backlit liquid crystal display (LCD), navigable using a user interface 106, such as a plurality of buttons, to provide access to indoor and outdoor temperature and humidity readings, setpoint adjustments, system mode and fan status indicators, scheduling, and setup menus. According to an embodiment, thermostat 101 may operate independently, or it may be networked to a central control system, such as a 3-Series® control system, available from Crestron Electronics, Inc. of Rockleigh, N.J., enabling global temperature and humidity adjustment from any thermostat.

Thermostat 101 may be connected to one or a plurality of remote sensors 111-113 for enhanced flexibility and optimized performance. Each remote sensor 111-113 may comprise an indoor or outdoor temperature sensor, humidity sensor, pressure sensor, airflow sensor, HVAC status sensor, occupancy sensor, carbon dioxide sensor, light sensor, color temperature sensor, any combinations thereof, or other types of sensors known in the art. For example, each remote sensor 111 and 112 may comprise a wall-mounted remote temperature and relative humidity sensor with indoor temperature measurement range of 0° to 110° F., outdoor temperature measurement range or −30° to 120° F., and humidity measurement range of 0% to 100% RH. Remote sensors 111 and 112 may comprise the CHV-RTS remote sensor available from Crestron Electronics, Inc. of Rockleigh, N.J. Remote sensor 113 may, on the other hand, comprise a temperature sensor designed for concrete slab, under floor, or any outdoor installation, by being potted within a rugged, waterproof stainless steel sleeve. Remote sensor 113 may comprise the CHV-RSS remote sensor available from Crestron Electronics, Inc. of Rockleigh, N.J. Climate can be regulated according to sensed conditions of a single sensor or an average of multiple sensors. Remote sensors 111-113 also enable monitoring of outdoor climate, enabling outdoor temperature compensation, for example, to prevent condensation on windows during cold weather.

Each remote sensor 111-113 may be connected to the thermostat 101 using a two-wire connection 110, such as a single non-polarized twisted-pair cable, Category 5 (CAT5) cable, or similar low-capacitance wire 110. Each sensor may be mounted at a different location and thereby distance from the thermostat 101. For example, each remote sensor 111-113 may comprise a 10 inch, 22 AWG, non-polarized, twisted-pair pigtail connection, which may be connected via two wires, either newly installed or existing wires in the wall, to an input terminal of the thermostat 101.

Figure 2:
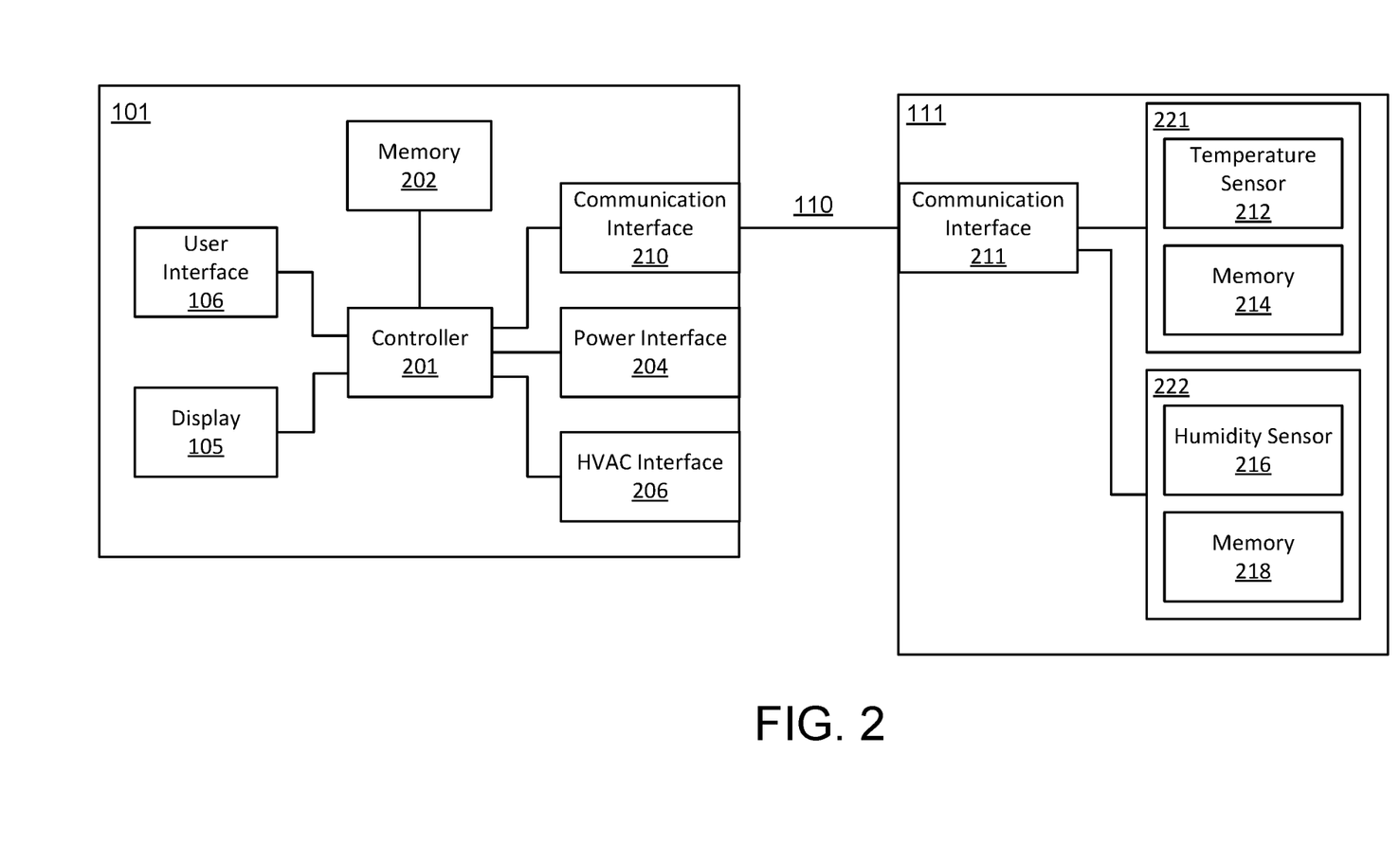
FIG. 2 shows an illustrative block diagram of the thermostat and the remote sensor according to the present embodiments.

FIG. 2 is an illustrative block diagram of the thermostat 101 and a remote sensor 111 according to an illustrative embodiment. The thermostat 101 may include a controller or microcontroller (MCU) 201. Controller 201 can represent one or more processors such as microprocessors, and the microprocessors can be "general purpose" microprocessors, a combination of general and special purpose microprocessors, application specific integrated circuits (ASICs), standard logic, or any combinations thereof. Additionally or alternatively, the controller 201 may include one or more reduced instruction set computer (RISC) processors, video processors, or related chip sets. The controller 201 can provide processing capability to execute an operating system, run various applications, and/or provide processing for one or more of the techniques and functions described herein. Applications that may run on the thermostat 101 may include, for example, software for controlling one or more HVAC systems 102, or communicating with one or more remote sensors 111-113, including running the timing discovery process described herein.

Thermostat 101 can further include a memory 202 communicably coupled to the controller 201, which may store data and executable code. The memory 202 may store information accessible by the controller 201, including instructions for execution by the controller 201. The memory 202 can represent nonvolatile memory, such as read-only memory (ROM) or Flash memory, or can also include volatile memory such as random-access memory (RAM). In buffering or caching data related to operations of the controller 201, memory 202 can store data associated with applications running on the thermostat 101.

Thermostat 101 may further comprise a display 105, such as an LCD display, and one or more user interface buttons 106. In another embodiment, thermostat 101 may comprise a touch screen. The thermostat 101 may be placed in a setup mode, such as the communication timing discovery mode described herein, via a series of menus displayed on the LCD display 105. Selections may be made via the one or more user interface buttons 106. Alternatively, the user may enter the setup mode by pressing and holding a button, such as a fan button, or a combination of buttons. The LED display 105 may indicate that the thermostat 101 is performing the setup mode by flashing or displaying information to the user.

Thermostat 101 may further comprise one or more terminal blocks with a plurality of terminals to provide one or more interfaces, such as communication, power, and control interfaces. Thermostat 101 may comprise a power interface 204 to receive remote power, such as 24 VAC power, to the various circuit components of the thermostat 101. Thermostat 101 may comprise HVAC interface 206, which may include one or more relays, to provide control to the HVAC system 102. Thermostat 101 may further comprise other wired input/output (I/O) interfaces for wired interconnection between the thermostat 101 and other types of electronic devices. The wired I/O interface may represent, for example, a universal serial bus (USB) port or an IEEE 1394 or FireWire® port, but may also represent a proprietary connection.

In addition, thermostat 101 may comprise a remote sensor communication interface 210 to provide connections to one or more remote sensors 111-113. The remote sensor communication interface 210 may comprise one or more communication channels for connection to one or more remote sensors 111-113. For example, one remote sensor 111 may be connected to the terminals of a first channel, and a second remote sensor 112 can be connected to the terminal of a second channel.

According to an embodiment, remote sensor 111 may comprise a communication interface 211 for connecting the remote sensor 111 to the thermostat 101. As described above, the communication interface 211 may comprise twisted-pair pigtail for wiring the remote sensor 111 via two wires to the thermostat 101. However, a terminal block or a similar connection may be used instead. According to an embodiment, remote sensor 111 may further comprise a temperature sensor part 221 and a humidity sensor part 222. Each sensor part 221/222 may sit on a separate integrated circuit (IC) and may comprise a sensing module, such as a temperature sensor 212 and a humidity sensor 216, although other types of sensors may be included as described above. In addition, each sensor part 221/222 may comprise a complementary or integrated memory 214/218, such as EEPROM or memory 202 described above, for storing general purpose data, such as sensor data. Each internal memory 214/214 may further store a unique identification code or serial number adapted to identify the particular sensing part. Remote sensor 111 may comprise additional circuit components, such as analog to digital converters (ADC) for analog type sensing modules.

When connected to the thermostat 101, the remote sensor 111 acts as a slave device and the thermostat 101 acts as a master controller adapted to provide power and control to the remote sensor 111 via the two wire connection 110. For example, the thermostat 101 can read or write data on the internal memory of the sensor parts 221/222 of the remote sensor 111 via the two wire connection 110. Using digital communication protocols, data signals between the thermostat 101 and remote sensor 111 may be transmitted using a single wire, referred herein as the data wire, while the second wire of the two wire connection 110, is used as ground. As such, both temperature and humidity information, or other type of sensor information, can be transmitted using the single data wire.

According to one embodiment, the thermostat 101 may address a single or a group of same sensor types without uniquely identifying each sensor. For example, to receive temperature sensor data, from one or more temperature sensors, the controller 201 may send over the two wire connection 110 a specific read command to address only the temperature type of sensors, such as a READ_TEMPERATURE command. In response, any temperature sensor connected to the thermostat 101 and recognizing such command, such as temperature sensor 212, would respond with their temperature readings. The controller 201 may receive a single sensor reading, or average a plurality of received temperature readings into a single temperature, to control the HVAC system. Such readings may be made over a single line 110, or over a plurality of lines to a plurality of remote sensors 111. Similarly, to receive humidity sensor data, the controller 201 may send a humidity read command that is recognized by one or more humidity sensors. In an alternative embodiment, during the setup mode, the thermostat 101 may discover each sensor using the unique identification code stored in the sensor memory. The controller 201 of the thermostat 101 may then uniquely address a particular sensor to receive its particular sensor data, for example for individual zone control. For example, the controller 201 may send a selection command and then the identification code of a particular sensor device. As a result, only the addressed sensor will execute the next command.

Figure 3A:
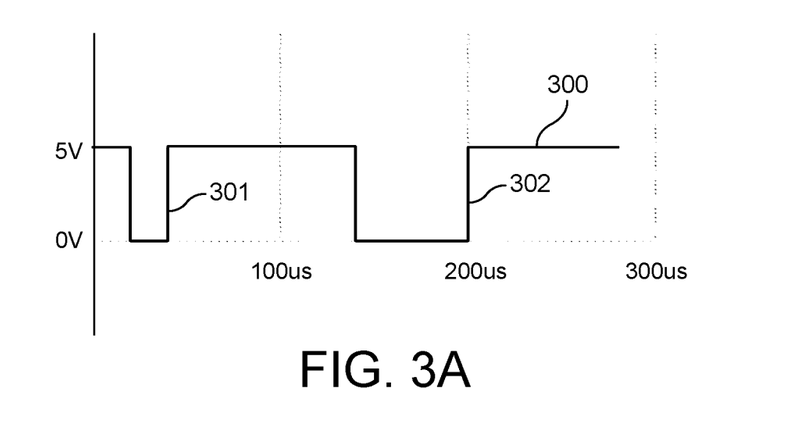
FIG. 3A shows a square wave of a sent signal according to the present embodiments.

Data over the two wire connection 110 is communicated using pulses over the data wire. The data wire is generally maintained high, at 3 V or 5 V by a pull up resistor. This allows to provide power to the slave remote sensor device. The controller 201 communicates with the remove sensor 111 via pulses of various pulse widths by pulling the data wire down to low or 0 V. Referring to FIG. 3A, there is shows a square wave signal 300 with two pulse 301 and 302. According to an embodiment, the controller 201 may initiate data transmission via a "reset" pulse by pulling the data wire to 0 volts for a predetermined timing value corresponding to the reset command, such as 480 microseconds. The slave remote sensor device may respond with a "presence" pulse by pulling the data wire to 0 V for a predetermined timing value corresponding to the presence command, such as 60 microseconds. Thereafter, to send a "1" or "high" on the data wire, the controller 201 may send a brief pulse 301 comprising a first predetermined timing value, such as 1 to 15 microseconds. To send a "0" or "low" on the data wire, the controller 201 sends a longer pulse 302 comprising a second predetermined timing value, larger than the first predetermined timing value, such as 60 microseconds. To recognize received communication, the receiving device determines the received timing value of the pulse and compares it to a pair of timing thresholds, for example to a high timing threshold to register the signal as "1" and to a low timing threshold to register the signal as "0".

Figure 3B:
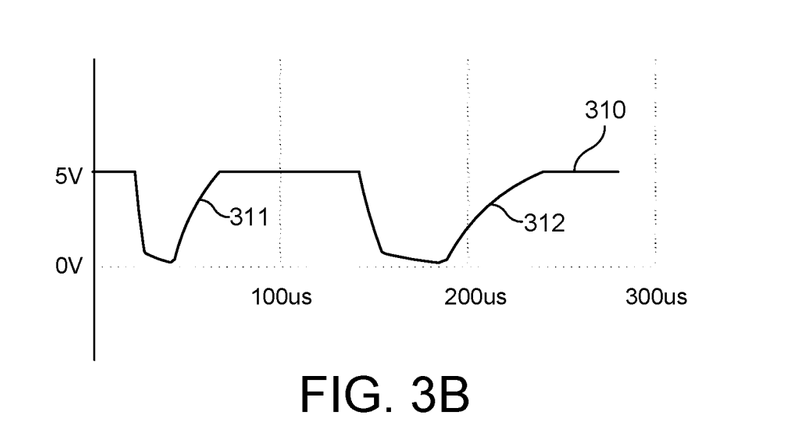
FIG. 3B shows a waveform of a read signal according to the present embodiments.

The timing thresholds used to detect whether the line is high or low, however, vary, can be hard to predict or constrain, and have a significant effect on sensor (and ultimately, thermostat) reliability. The timing thresholds can be affected by installation characteristics such as cable length, cable type, the number of devices on the cable, proximity to other equipment, or the like. In addition, each sensor part, such as the temperature sensor part 221 and the humidity sensor part 222, have digital logic parts, and thereby by design they have different electrical characteristics, namely, they have different specifications on the digital logic thresholds for the data connection. This causes the rise and fall times of the received signal to be very slow, or shallow. For example, FIG. 3B shows an illustrative waveform 310 of a read signal showing slow rise and fall times of received pulses 311 and 312. The longer the distance from the thermostat 101 to the remote sensors 111-113, and the larger the loading on a single cable, the more egregious these timing discrepancies may become. As a result, the slow bus rise/fall times cause the receiving device to see a different receiving timing values for the pulses than what was originally sent. The slow state can further cause timing for one sensor type not to work for another sensor type. This problem is exacerbated by the sensor's non-polarized hardware interface, which causes the internal bus state to be even slower than what is seen on the cable.

Accordingly, the present embodiments provide a system and method for discovering the digital communication timing requirements for a two wire connection, such as for remote sensors 111-113 connected to a thermostat 101 over one or a plurality of two wire connections 110. Such system and method automatically locates the best timing value for the used parts, their digital logic, and installation conditions through an iterative timing discovery operation by assessing communication quality via packet error rate detection through a sweep of timing values as described below. As such, the master controller 201 of the thermostat 101 can adapt to the remote sensor's 111-113 actual timing values, rather than trying to guess the best compromises against their tolerances. The present embodiments further maximize reliability of the communication by allowing optimal timing values with smallest error rates to be automatically adjusted to the conditions found at the installation without requiring skill or training from the installer or advance knowledge of the installation's characteristics. The present solution is implemented without giving up a sensor source (e.g., by having to go with temperature-only analog type sensor solution), without requiring more wires (e.g., a 4-wire RS-485 solution), and without having to run new cables since two wires would be the minimum conductor count that would be present in a retrofit installation.

Figure 4:
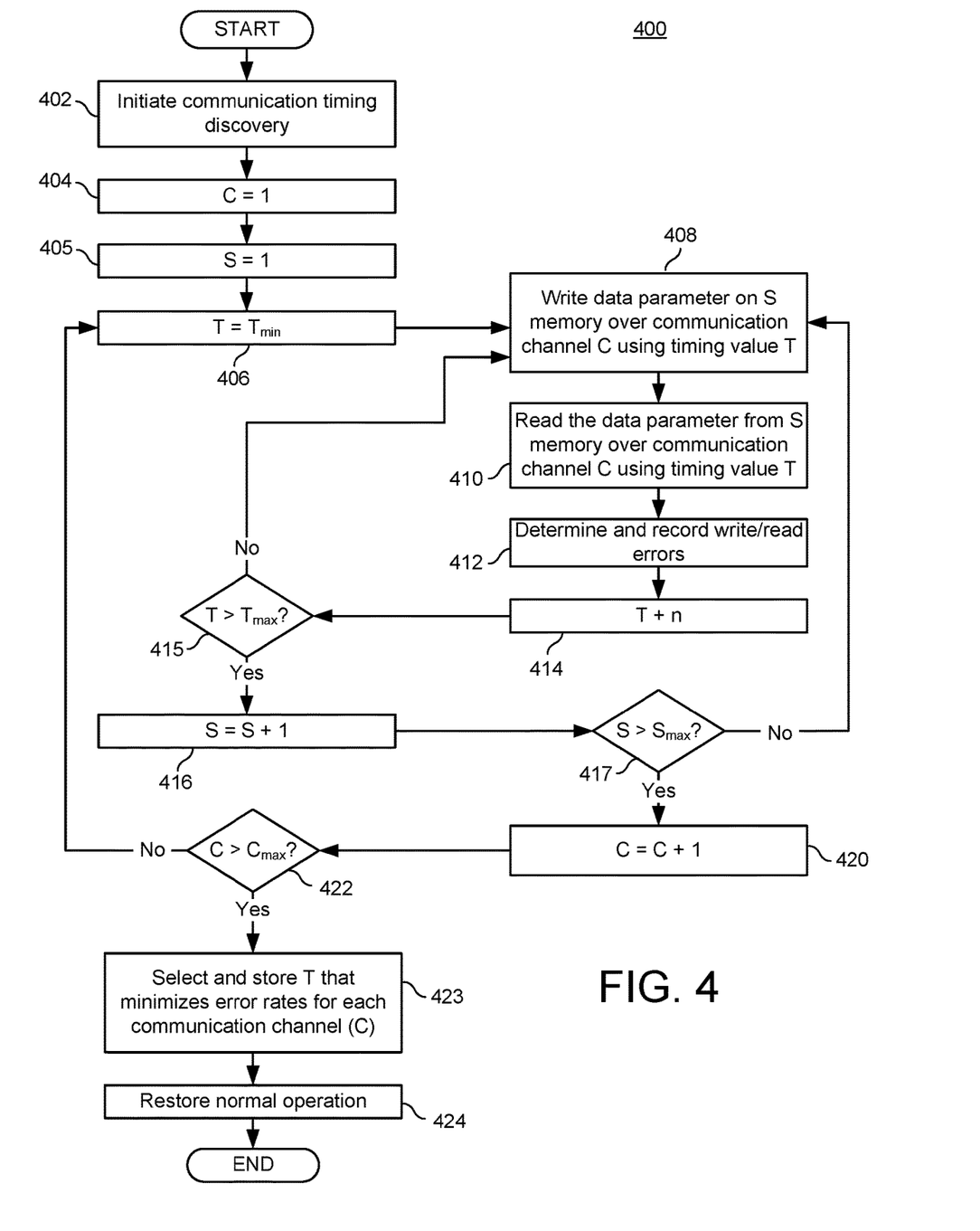
FIG. 4 shows a flowchart illustrating the steps for a method of digital communication timing discovery over a two wire connection according to the present embodiments.

FIG. 4 shows a flowchart 400 illustrating the steps for a method of digital communication timing discovery over a two wire connection. The method is initiated in step 402. According to an embodiment, the thermostat controller 201 may initiate the communication timing discovery and in response adjust timing thresholds to provide an operating point for the system after the thermostat 101 is installed by entering into a setup mode either automatically or manually by an installer via the user interface 106 of the thermostat 101. According to another embodiment, the communication timing discovery may be determined at each thermostat startup, every time after power is removed from the thermostat 101, for example due to power outage or circuit breaker trip or turn off, or the like. Accordingly, the process may be triggered as soon as installation properties have changed. For example, power may be removed from the thermostat 101 to replace one of the remote sensors 111-113. Although the communication timing discovery may be initiated manually at any time via the user interface 106 of the thermostat 101, for example by resetting the thermostat's settings. According to a further embodiment, the discovery event may be initiated automatically based on triggering a predetermined condition. For example, the discovery event may be initiated every 100 or another number of sensor communication errors by the thermostat controller 201 enabling it to adjust to changing conditions. After initiating communication timing discovery in step 402, normal sensor communication events may be suspended and the user may be informed that a timing discovery process is being performed using the thermostat display 105.

According to an embodiment, the present process for discovering the communication timing requirements is performed for every device or device type on every channel of the master controller, such as controller 201 of the thermostat 101. According to an embodiment, in step 404 the communication channel counter is set to 1 and in step 405 the sensor type counter is also set to 1, to perform the timing discovering process on a first sensor type on the first channel. According to an embodiment, each sensor type may be assigned a numerical value for identification.

Next, the controller 201 attempts to communicate with the remote sensors using various timing values to determine whether the remote sensor is communicating properly. The controller 201 may perform a write/read operation on the first sensor type over the first communication channel over a range of timing values starting from the most sensitive timing parameter, for example from a minimum timing value ($T_{min}$) to a maximum timing value ($T_{max}$). The minimum timing value ($T_{min}$) and the minimum timing value ($T_{min}$) may be predetermined values stored in memory 202 of the thermostat 101. For example, the timing communication range may comprise from about 1.25 microseconds to about 18.75 microseconds, in about 20 increments. Particularly, in step 406, the timing parameter (T) is set to a minimum timing value ($T_{min}$). In step 408, the master controller 201 writes a data parameter over the first communication channel using the minimum timing value ($T_{min}$) on any available general purpose memory of the first sensor type, such as memory 214 of the temperature sensor part 221. The data parameter may include any data parameter, such as general purpose data, capable of being written on a memory location of a slave device. For example, the data parameter may comprise a single high or "1" value as this is the most sensitive parameter that creates the most disparity in the logic timing of remote sensor devices. Although the data parameter may be more complex. For example, referring to FIG. 2, the controller 201 may send a WRITE_TEMP1 command to write temperature data on memory 214 of temperature sensor part 221. Then in step 410, the master controller 201 attempts to read the data parameter back from the memory of the first sensor type over the first communication channel using the minimum timing value ($T_{min}$). In step 412, the master controller 201 determines whether there was an error in the write/read operation, i.e., whether the master controller 201 was able to read back the data parameter it attempted to write on the memory of the first sensor type over the first communication channel. If the correct data parameter is read back, then the master controller 201 records that there was no error in communication—e.g., 0% error rate. Otherwise the master controller 201 records an error in communication—for example, 100% error rate when no data parameter is received back (i.e., there is no communication on the line).

According to an embodiment, the communication attempt may be made a single time per each timing parameter of each sensor type over each communication channel. According to another embodiment, the communication attempt is repeated a predetermined number of times per each timing parameter, for example eight times, and the write/read errors are averaged for that timing parameter—for example, according to an embodiment the error rate is determined from a ratio of incorrect reads to total reads. The process then proceeds to step 414 where the timing parameter (T) is incremented by a predetermined timing increment (n). The predetermined timing increment (n) may be a single digit increment, such as 1 nanosecond, or it may comprise a multi digit increment, such that communication attempts are made very 125 nanoseconds. The timing parameter (T) is then compared to a maximum timing value ($T_{max}$) in step 415. If the timing parameter (T) is smaller than the maximum timing value ($T_{max}$), then the process of steps 408-414 is repeated for the incremented timing parameter (T). The communication attempt with the first sensor type over the first communication channel is repeated for a range of timing values between the minimum timing value ($T_{min}$) and the maximum timing value ($T_{max}$). For each communication attempt, error rates are determined and recorded. For example, error rates may be recorded for each tested timing parameter of every sensor type or every channel in memory 202 of the thermostat 101 in a form of a table.

Once the timing parameter (T) is incremented above the maximum timing value ($T_{max}$), the controller 201 moved to step 416 where the sensor type counter (S) is incremented to perform the write/read sweep and error recording of steps 408-415 on the next sensor type over the first communication channel, for example on the humidity sensor part 216. As such, there is a write/read error record created for each sensor type on the communication channel. The controller 201 performs the write/read operation on all sensor types until the sensor type counter (S) exceeds a maximum sensor type count ($S_{max}$) in step 417. Then in step 420, the controller 201 increments the communication channel counter (C) by 1 to repeat to determine the communication timing requirement for the next communication channel, thereby repeating and reiterating steps 406 through 417 for each sensor type on the next communication channel, for example a second communication channel. The controller 201 determines that timing requirements have been determined for all available communication channels when the channel counter exceeds the maximum channel count ($C_{max}$) in step 422.

After collecting error data in the timing sweeps across all sensor types on all available communication channels, the operating point for thermostat 101 is selected for each communication channel. Accordingly, the process moves to step 423, where the controller 201 selects and stores a timing value that minimizes error rates for each communication channel. According to an embodiment, the controller 201 may select and store a timing value per each sensor type on the each communication channel. For example, a first timing value for a temperature sensor type on a first communication channel, a second timing value for a temperature sensor type of the first communication channel, and a third timing value for a humidity sensor type on a second communication channel. According to an embodiment, for each sensor on each communication channel, the controller 201 may select the timing value with the lowest error value from the stored write/read record. According to another embodiment, a range of data points or timing values with minimum error values may be determined and a midpoint or another point within this range may be selected and used as the timing operating point.

For example, Table 1 below illustrates recorded communication error rates for temperature sensor parts (e.g., 221) (Temp_E) and humidity sensor parts (e.g., 222) (Hum_E) on exemplary channels 1 and 2.

TABLE 1

| | Channel 1 | | | Channel 2 | |
|---|---|---|---|---|---|
| T | T-PER | H-PER | T | Temp_E | Hum_E |
| 10 | 100.0% | 100.0% | 10 | 100.0% | 100.0% |
| 17 | 0.0% | 100.0% | 17 | 100.0% | 100.0% |
| 24 | 0.0% | 100.0% | 24 | 100.0% | 100.0% |
| 32 | 0.0% | 100.0% | 32 | 0.0% | 100.0% |
| 39 | 0.0% | 100.0% | 39 | 0.0% | 100.0% |
| 46 | 0.0% | 100.0% | 46 | 0.0% | 0.0% |
| 54 | 0.0% | 100.0% | 54 | 0.0% | 0.0% |
| 61 | 0.0% | 100.0% | 61 | 0.0% | 0.0% |
| 68 | 0.0% | 100.0% | 68 | 0.0% | 0.0% |
| 76 | 0.0% | 100.0% | 76 | 0.0% | 0.0% |
| 83 | 0.0% | 100.0% | 83 | 0.0% | 0.0% |
| 91 | 0.0% | 100.0% | 91 | 0.0% | 0.0% |
| 98 | 0.0% | 100.0% | 98 | 0.0% | 0.0% |
| 105 | 100.0% | 100.0% | 105 | 0.0% | 0.0% |
| 113 | 100.0% | 100.0% | 113 | 0.0% | 25.0% |
| 120 | 100.0% | 100.0% | 120 | 0.0% | 87.5% |
| 127 | 100.0% | 100.0% | 127 | 0.0% | 100.0% |
| 135 | 100.0% | 100.0% | 135 | 0.0% | 100.0% |
| 142 | 100.0% | 100.0% | 142 | 100.0% | 100.0% |
| 150 | 100.0% | 100.0% | 150 | 100.0% | 100.0% |

The timing parameter (T) in Table 1 represents a timing value or integer that is equivalent to 125 nanoseconds. The errors captured in the example of Table 1 were made with a thermostat 101 connected via a short cable to a first remote sensor on channel 1 and via a long cable to a second remote sensor on channel 2. The first remote sensor connected over channel 1 comprises only a temperature sensor part, such as sensor 113 in FIG. 1, and thereby there is 100% communication error rate at the humidity sensor type on the first channel as there is no sensor talking. The second remote sensor connected over channel 2 in this example comprises a temperature sensor part and a humidity sensor part, such as sensor 111 in FIG. 1.

As seen in the data, the falloff of digital sensor communication tends to be sudden, with little marginal area. As such, it has been found that almost as soon as the timing value gets outside of successful communication range, communication error rates go to 100%. Accordingly, for safety, areas that are reported "marginal" (e.g., timing values 17 and 98 on channel 1) should be assumed to be closer to failure than the error rate may imply. For example, communication parameters are temperature dependent with significant temperature changes causing a shift in the appropriate timing value. As such, the chosen timing value should not be on an edge of the communication error rate range. Therefore, according to an embodiment, the operating timing point for channel 1 for the temperature sensor may be chosen as a timing value 54—i.e., a midpoint timing value within a timing values range that comprise zero error rates. On the other hand, a timing value of 83 may be chosen for the temperature sensor on channel 2 and a separate timing value of 76 may be chosen for the humidity sensor on channel 2. It can be seen from the data that channel 2 has a longer wire length, as its operating point for the temperature sensor has landed on 83, versus 54 for the temperature sensor on channel 1. The longer drive time is accounting for the slower transitions on the line. In addition, the humidity sensor is generally less robust than the temperature sensor, so its range of low error values is smaller. This can be seen in the channel 1 section with the humidity error rates (Hum_E) being 0% over a smaller range of timing values than the temperature error rates (Temp_E) section on the same channel.

Figure 5A:
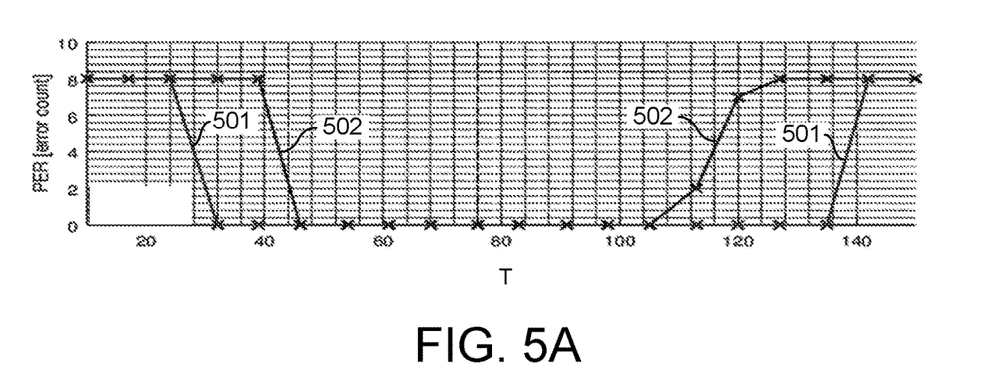
FIG. 5A illustrates plots of the error rates for the temperature sensor and the error rates for the humidity sensor according to the present embodiments.
Figure 5B:
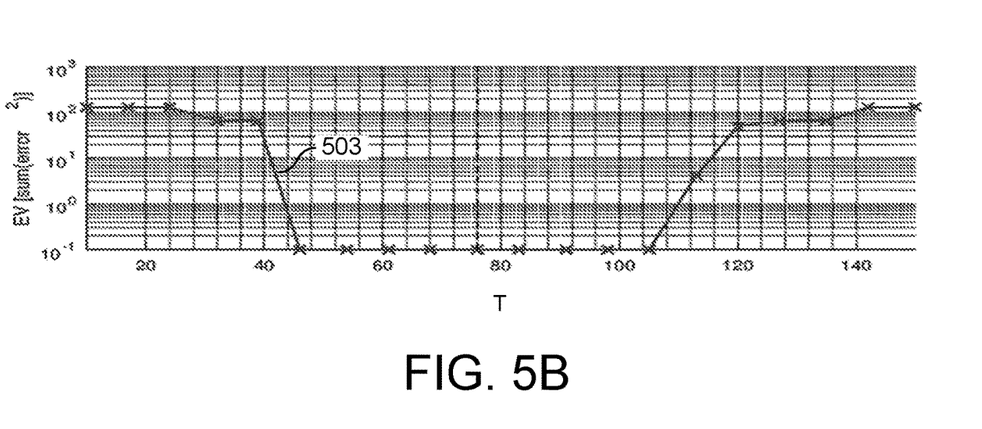
FIG. 5B illustrates a plot of resulting error vector according to the present embodiments.

According to an alternative embodiment, a single timing value may be chosen for each communication channel for all the sensor types on that channel. Such a timing operating point may be selected to fall in the lowest error region for all the sensor types on that channel. According to an embodiment, the controller 201 may calculate an exponential error vector. The purpose of exponentiating is to expose and eliminate zero (or small) error values that are marginal and may potentially harm communication. Specifically, for each timing point of each sensor type, the controller 201 may square each error rate. Then, the controller 201 may sum the squared error rates of the various sensor types at each timing point to find the error vector value for that point. For example, referring to FIG. 5A, plot 501 represents the error rates for the temperature sensor on channel 2 and plot 502 represents the error rates for the humidity sensor on channel 2. Referring to FIG. 5B, plot 503 represents the resulting error vector of the error rates for each timing point. Then, the controller 201 may search the resulting error vector, such as vector 503, to find an operating point. Specifically, the controller 201 may find the lowest error value in the vector (e.g., zero), determine the range of all data points with this minimum value (e.g., timing values between 46 and 105), and find the midpoint of this range to use it as the operating point for that channel. As such, the operating timing point for channel 2 for both the temperature and humidity sensors may be chosen as a timing value 76.

According to still alternative embodiment, instead of performing communication tests on sensor types on each communication channel, the thermostat controller 201 may be configured to address each remote sensor individually. In such an implementation, the master controller 201 may perform a discovery process to discover all the remote sensors or devices connected to the thermostat 101 via their unique identification codes. In such implementation, a plurality of remote sensors or devices may share the same communication channel and be connected to the thermostat 101 via different wire lengths. The master controller 201 may then perform the timing discovery method discussed in steps 408-412 and 423 to find the optimal communication timing value for each individual sensor on each communication channel.

In step 424, the controller 201 may restore normal operation. During normal operation, the thermostat controller 201 may use the selected and stored timing values for communication over each communication channel, each sensor type on each communication channel, or each individual sensor on each communication channel, depending on desired implementation.

INDUSTRIAL APPLICABILITY

The disclosed embodiments provide a system, software, and a method for digital communication timing discovery over a two wire connection. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus, the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

Additionally, the various methods described above are not meant to limit the aspects of the embodiments, or to suggest that the aspects of the embodiments should be implemented following the described methods. The purpose of the described methods is to facilitate the understanding of one or more aspects of the embodiments and to provide the reader with one or many possible implementations of the processed discussed herein. The steps performed during the described methods are not intended to completely describe the entire process but only to illustrate some of the aspects discussed above. It should be understood by one of ordinary skill in the art that the steps may be performed in a different order and that some steps may be eliminated or substituted. For example, step 423 may come right after step 412.

All United States patents and applications, foreign patents, and publications discussed above are hereby incorporated herein by reference in their entireties.

ALTERNATE EMBODIMENTS

Alternate embodiments may be devised without departing from the spirit or the scope of the different aspects of the embodiments.

What is claimed is:

1. An HVAC system comprising:
   a remote sensor unit comprising at least one sensor with an associated memory;
   a thermostat comprising:
   a communication interface to be connected to the remote sensor unit via a two-wire connection over a communication channel; and
   a controller to perform a communication timing discovery, wherein for each sensor of the remote sensor unit the controller is to:
   perform a communication error rate detection operation over a range of timing values between a minimum timing value and a maximum timing value, wherein for each timing value in the range of timing values the controller is to:
write a data parameter on a memory of a respective sensor using a respective timing value,
attempt to read the data parameter from the memory of the respective sensor using the respective timing value, and
determine an error rate for the respective timing value indicating the rate of success of the read attempt;
select a communication timing value from the range of timing values that minimized error rates during the communication error rate detection operation; and
use the selected communication timing value for communicating with the respective sensor during normal operation to receive sensor information.

2. The HVAC system of claim 1, wherein the controller records an error or a high error rate when the read attempt of the data parameter is unsuccessful, and wherein the controller records no error or a low error rate when the read attempt of the data parameter is successful.

3. The HVAC system of claim 1, wherein the controller repeats the communication error rate detection operation a plurality of times per each timing value of the range of timing values and averages the determined error rates for the respective timing value.

4. The HVAC system of claim 1, wherein the controller selects the communication timing value that minimized error rates by:
finding a lowest error rate from the determined error rates of respective timing values of the range of timing values;
determining a subset range of timing values comprising error rates equal to the lowest error rate; and
selecting a communication timing value from the subset range of timing values.

5. The HVAC system of claim 4, wherein the controller selects a communication timing value located at a midpoint of the subset range of timing values as the communication timing value that minimized error rates.

6. The HVAC system of claim 1, wherein the communication interface of the thermostat comprises a plurality of communication channels.

7. The HVAC system of claim 6, wherein the controller performs the communication timing discovery for each of the plurality of communication channels.

8. The HVAC system of claim 1, wherein the system comprises a plurality of sensors each with an associated memory, wherein the plurality of sensors are either located within a single remote sensor unit connected to the thermostat over a single communication channel, distributed among a plurality of remote sensor units connected to the thermostat over a single communication channel, distributed among a plurality of remote sensor units each connected to the thermostat over a separate communication channel, or any combinations thereof.

9. The HVAC system of claim 8, wherein the controller performs the communication error rate detection operation for each of the plurality of sensors by addressing the plurality of sensors by sensor type.

10. The HVAC system of claim 8, wherein each memory associated with each of the plurality of sensors comprises an identification code to identify the respective sensor.

11. The HVAC system of claim 10, wherein the controller performs the communication error rate detection operation for each of the plurality of sensors by addressing each sensor by its identification code.

12. The HVAC system of claim 8, wherein a communication timing value is selected for each sensor type of the plurality of sensors over each communication channel.

13. The HVAC system of claim 8, wherein a communication timing value is selected for each individual sensor over each communication channel.

14. The HVAC system of claim 8, wherein a communication timing value is selected for all sensors of the plurality of sensors connected on each communication channel.

15. The HVAC system of claim 14, wherein each communication timing value for all the sensors of the plurality of sensors on each communication channel is selected by:
calculating an exponential error vector from the determined error rates of the range of timing of all the sensors on the respective communication channel;
finding a lowest error rate from the calculated exponential error vector;
determining a subset range of timing values comprising error rates equal to the lowest error rate; and
selecting a communication timing value from the subset range of timing values.

16. The HVAC system of claim 15, wherein the controller calculates the exponential error vector by:
squaring each stored error rate determined for the respective communication channel;
summing sets of the squared error rates corresponding to each timing value of the range of timing values; and
constructing the exponential error vector using the summed sets of squared error rates.

17. The HVAC system of claim 15, wherein the controller selects a communication timing value located at a midpoint of the subset range of timing values as the communication timing value that minimized error rates.

18. The HVAC system of claim 1, wherein the two-wire connection comprises a data wire and a ground wire.

19. The HVAC system of claim 1, wherein each sensor comprises at least one of a temperature sensor, a humidity sensor, a pressure sensor, an airflow sensor, an HVAC status sensor, an occupancy sensor, a carbon dioxide sensor, a light sensor, and a color temperature sensor.

20. An HVAC system comprising:
a plurality of remote sensor units each comprising at least one sensor each comprising an associated memory;
a thermostat comprising:
a communication interface to be connected to each of the plurality of remote sensor units via a two-wire connection over at least one communication channel; and
a controller to perform a communication timing discovery, wherein for each sensor of the plurality of remote sensor units over each communication channel the controller is to:
perform a communication error rate detection operation over a range of timing values between a minimum timing value and a maximum timing value, wherein for each timing value in the range of timing values the controller is to:
write a data parameter on a memory of a respective sensor using a respective timing value,
attempt to read the data parameter from the memory of the respective sensor using the respective timing value, and determine an error rate for the respective timing value indicating the rate of success of the read attempt;

select a communication timing value from the range of timing values that minimized error rates during the communication error rate detection operation; and use the selected communication timing value for communicating with the respective sensor during normal operation to receive sensor information.

21. A method of performing a communication timing discovery by a thermostat connected via a two-wire connection to a remote sensor unit comprising at least one sensor with an associated memory, the method comprising the steps of:

performing a communication error rate detection operation over a range of timing values between a minimum timing value and a maximum timing value, wherein for each timing value in the range of timing values the communication error rate detection operation comprises the steps of:

writing a data parameter on the memory of the at least one sensor using a respective timing value, attempting to read the data parameter from the memory of the at least one sensor using the respective timing value, and determining an error rate for the respective timing value indicating the rate of success of the read attempt;

selecting a communication timing value from the range of timing values that minimized error rates during the communication error rate detection operation; and using the selected communication timing value for communicating with the at least one sensor during normal operation to receive sensor information.

22. A system for detecting communication timing requirements over a two-wire connection comprising:

a plurality of remote slave devices each comprising an associated memory;

a master controller device comprising:

a communication interface to be connected to each of the plurality of remote slave devices via a two-wire connection over at least one communication channel; and a controller to perform a communication timing discovery, wherein for each of the plurality of remote slave devices over each communication channel the controller is to:

perform a communication error rate detection operation over a range of timing values between a minimum timing value and a maximum timing value, wherein for each timing value in the range of timing values the controller is to:

write a data parameter on a memory of a respective remote slave device using a respective timing value, attempt to read the data parameter from the memory of the respective remote slave device using the respective timing value, and determine an error rate for the respective timing value indicating the rate of success of the read attempt;

select a communication timing value from the range of timing values that minimized error rates during the communication error rate detection operation; and use the selected communication timing value for communicating with the respective remove slave device during normal operation.

* * * * *